Oct. 25, 1966   J. W. HOLDEMAN   3,280,657
TRANSMISSION APPARATUS
Filed April 22, 1963   3 Sheets-Sheet 3
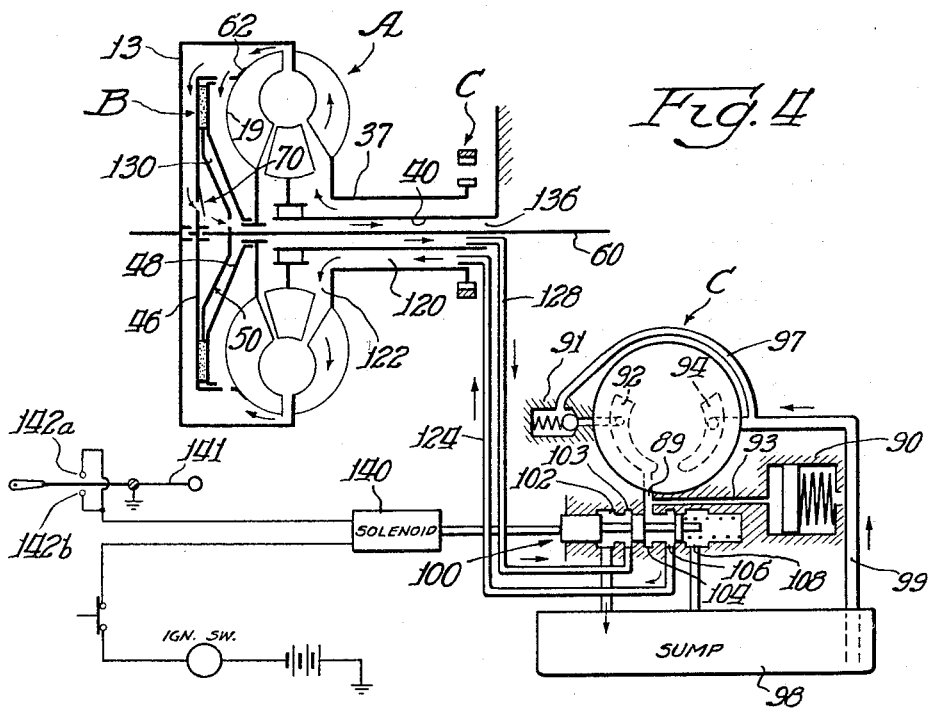
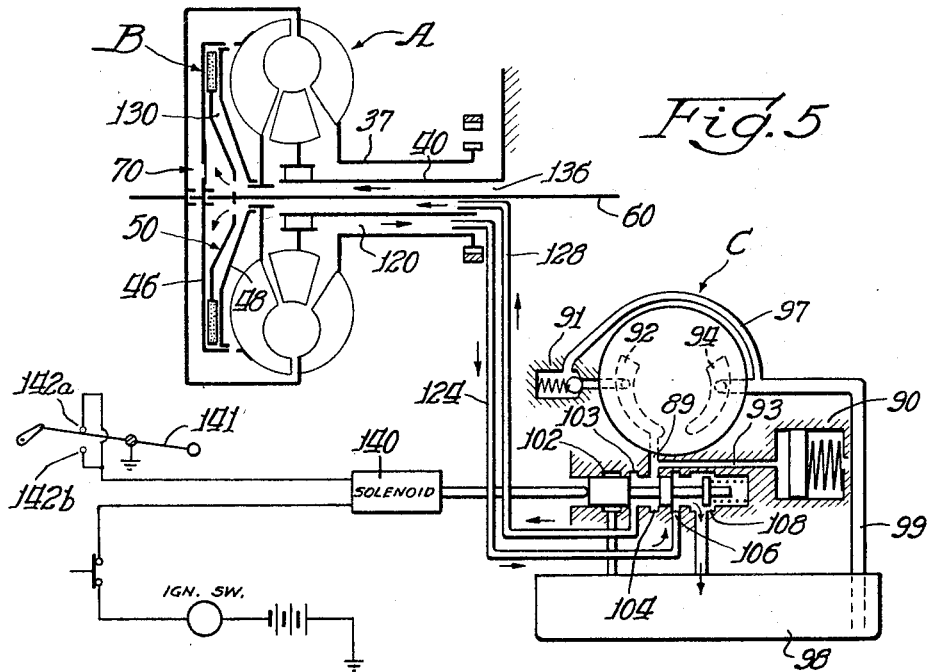
Inventor:
John W. Holdeman
By: Thomas B. Hunter
Atty.

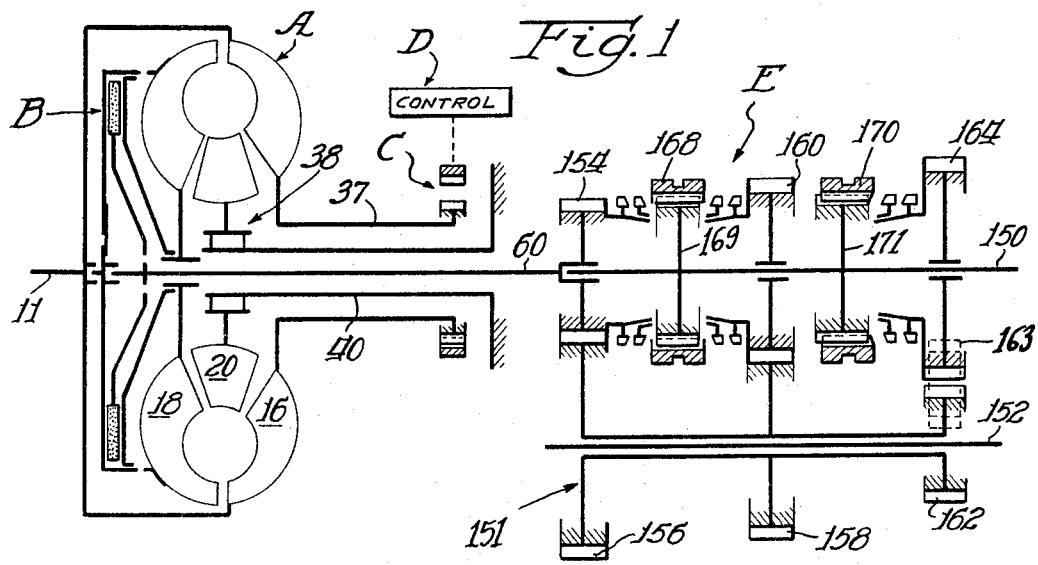
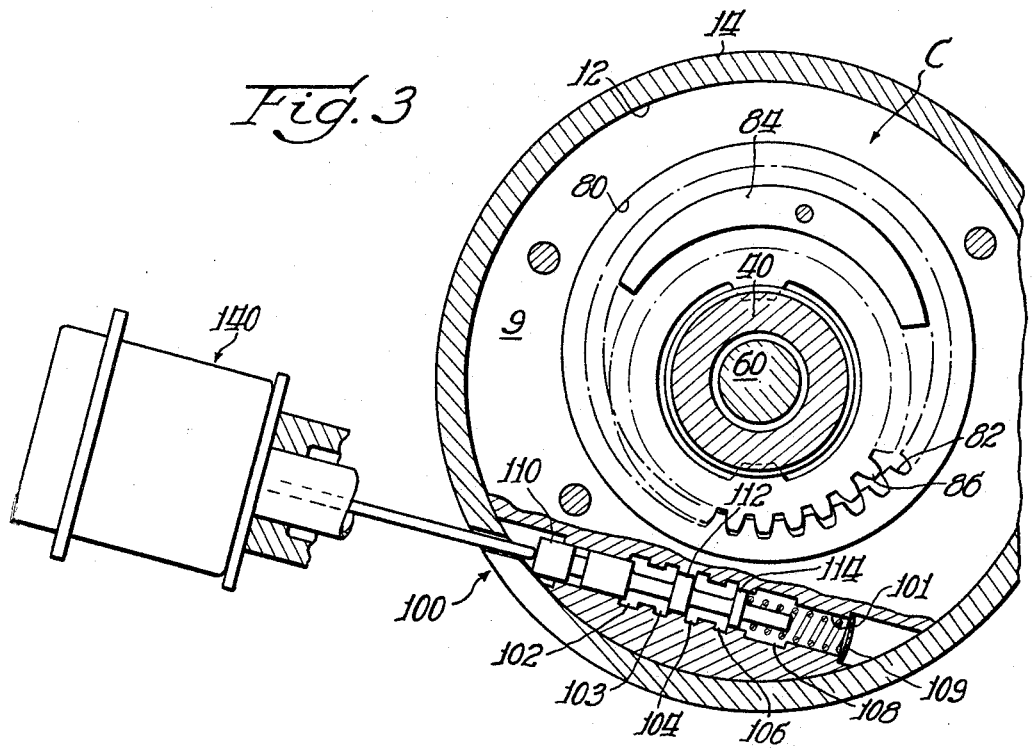

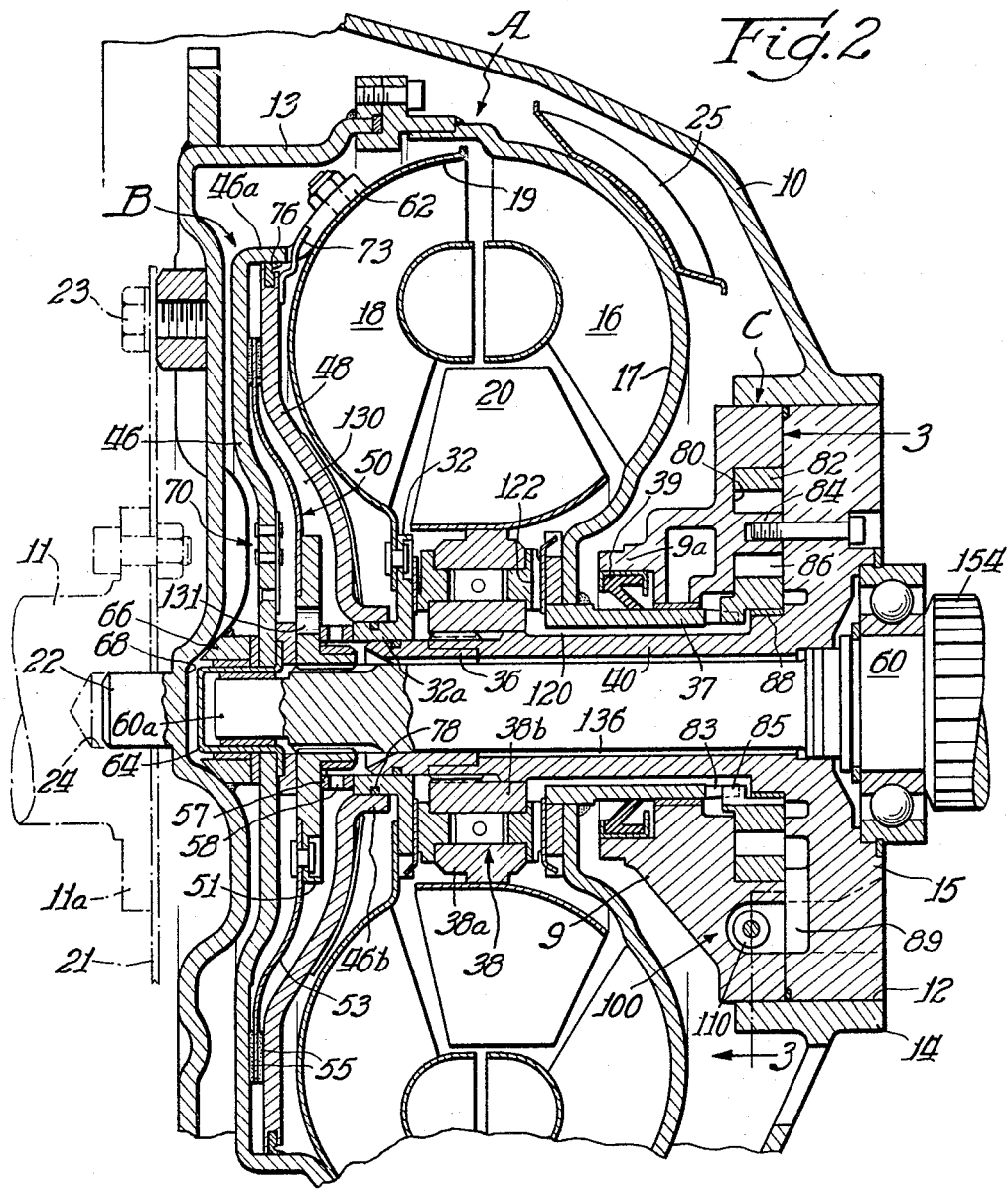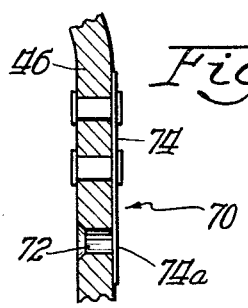

United States Patent Office 3,280,657
Patented Oct. 25, 1966

3,280,657
TRANSMISSION APPARATUS
John W. Holdeman, Auburn, Ind., assignor to Borg-Warner Corporation, a corporation of Illinois
Filed Apr. 22, 1963, Ser. No. 274,723
17 Claims. (Cl. 74—732)

This invention relates generally to transmission apparatus and more particularly to an improved vehicle transmission having selectively actuated clutch means in the drive line.

During the past several years, the trend in the automotive industries has been toward semi-automatic and fully automatic transmissions. Although automatic transmissions make the driving of an automotive vehicle substantially easier, and have met with widespread acceptance, such transmissions are much more expensive to produce than the conventional countershaft transmissions, primarily because of the more complicated construction including intricate hydraulic control systems. In addition, somewhat more engine power is absorbed by an automatic transmission through the automatic engaging devices and the more complicated gearing arrangements, an important factor to be considered with low-powered vehicles.

The transmission of the present invention is intended to incorporate most of the advantages of an automatic transmission while utilizing a conventional countershaft transmission in combination with a power actuated clutch, and includes a hydraulic control system for providing the power to actuate the clutch. The system is arranged so that the clutch will be disengaged when the countershaft transmission is conditioned for a gear shift and when the vehicle is in its neutral condition. Moreover, the transmission can be manually shifted into the higher gear ratios without the necessity for manually disengaging the clutch, so that the usual clutch pedal may be eliminated.

The present invention may be regarded as an improvement over known semi-automatic transmissions in that the system embodying the invention has several advantageous features including a continuous fluid circulation system and other novel constructions and arrangements which will become apparent from the following description thereof.

It is therefore a principal object of the present invention to provide a practical compromise between the superior performance of a fully automatic transmission and the lower cost of the manual transmissions still used on a great many automotive vehicles.

It is another object of the invention to avoid the complicated and expensive hydraulic system associated with automatic transmissions.

Another object of the invention is to eliminate power consuming clutches and brakes commonly used for operating the planetary gear sets in a fully automatic transmission.

Another object of the invention is to provide a hydraulic system including a torque converter fluid circuit which provides continuous re-circulation of hydraulic fluid while drive is transmitted through the transmission.

Other and more particular objects and advantages will be apparent from the following detailed description taken in conjunction with the appended drawings wherein:

FIGURE 1 is a schematic representation of a preferred embodiment of the present invention;

FIGURE 2 is a cross-sectional view of a portion of the overall transmission unit;

FIGURE 3 is a cross-sectional view taken along the plane of line 3—3 of FIGURE 2;

FIGURE 4 is a schematic illustration of the hydraulic system showing the position of the valves with the clutch in the engaged position;

FIGURE 5 is a schematic illustration of the hydraulic system with the clutch in the disengaged position; and FIGURE 6 is a detailed cross-sectional view of a unidirectional valve means associated with the clutch.

Referring now generally to FIGURE 1, the transmission apparatus embodying the principles of the present invention includes fluid coupling means in the form of a torque converter A, clutch means B, pump means C, control means D for controlling the discharge from the said pump means, and a countershaft transmission E driven by the torque converter output shaft.

In order to permit shifting of the countershaft transmission, a clutch or disengaging means is provided in the drive line between the engine crank shaft and said transmission. Accordingly, clutch means B is integrated into the drive line between the turbine element of the torque converter and the shaft connecting the output of the torque converter with the countershaft transmission.

Clutch means B is maintained in its engaged position by the pressure of hydraulic fluid within the torque converter housing. In the normal driving position, pump means C supplies hydraulic fluid under pressure to the torque converter fluid circuit comprising rotatably mounted impeller and turbine elements and a reaction element or stator. The pressure of this fluid is supplied to a clutch actuating means to maintain the clutch in a position whereby the turbine element is coupled with the output shaft of the torque converter. To condition the countershaft transmission for changing the gearing arrangement thereof, the output of the pump is reversed so as to supply pressurized hydraulic fluid to the clutch to disengage the same while permitting fluid within the torque converter fluid circuit to be vented to sump (atmospheric) pressure. After the shift is completed, the direction of flow from the pump is again reversed to assume the normal operational mode whereby fluid is supplied, in series, to the torque converter fluid circuit and the clutch actuating means to engage the clutch.

The semi-automatic features for effecting the shift of pump output pressure may include a switch associated with the manual shift lever for actuating a solenoid which in turn selectively moves a valve to one or the other of its operative positions. On the other hand, the actuation of the valve may be tied in to engine speed, throttle position, manifold vacuum, or some other operating condition by means familiar to those skilled in the art.

The torque converter

Referring now to FIGURES 2 and 3, the torque converter includes a bell-shaped housing 10 adapted to be secured in position behind an automobile engine (assuming an automotive installation). The housing 10, enclosing a torque converter structure A, the clutch B, and the pump C, is provided with a central opening 12 at the rear portion thereof having a surrounding flange 14 adapted to support the pump casing 9 and the enlarged portion of the stator support structure 15.

As is conventional with most hydrokinetic torque multiplying devices, the torque converter A comprises a plurality of rotatable vaned elements including an impeller 16, a turbine 18, and a reaction member or stator 20. The impeller element 16, having a rear casing portion 17, is at the rear of the unit and is connected to the driving shaft 11 by way of the shroud or forward casing portion 13. Drive between the driving shaft 11 and the forward casing portion is obtained through a plate 21 secured to a flange 11a on the driving shaft and fastened to the casing portion 13 by means of cap screws 23. The casing portion 13 is provided with a pilot stem 22 integral therewith extending into an axial pilot opening 24 in the end of the driving shaft 11. If desired, a series of cooling fins 25 may be provided on the external surface of the impeller casing 17 to promote the dissipation of heat generated within the torque converter.

The turbine element 18 comprises a relatively thin metal shell 19 connected at its radially innermost portion to an annular hub member 32 rotatably journalled on an axial extension 36 of stator support sleeve 40.

The reaction member or stator 20, positioned between the turbine and the impeller, is secured to the outer race 38a of a one-way engaging device 38, said device having an inner race 38b which is splined or otherwise secure against rotation to the stator support sleeve 40. The impeller 16 is connected to a sleeve shaft 37 arranged concentrically with respect to the reactor sleeve and adapted to drive the pump C in a manner which will be explained below in greater detail. A fluid seal 39 is preferably provided between an axially extending lip 9a on the pump casing 9 and the external surface of the sleeve shaft 37.

The clutch

As best shown in FIGURE 2, the clutch means B for selectively coupling and decoupling the turbine 18 to driven shaft 60 comprises a driven clutch plate 50 positioned within a clutch chamber 130, said clutch chamber being defined by an axially fixed plate 46 and an axially movable plate or piston 48. The clutch plate 50 includes an annular hub 51, splined or otherwise secured for driving connection to the output or driven shaft 60, and a relatively thin metal plate 53 secured to the hub member, said metal plate having a peripheral portion provided with friction facings 55 on opposite sides thereof. The hub 51 of the clutch plate is spaced from the turbine hub 32 by a thrust bearing 57 which is provided with a plurality of radially extending slots or apertures 58 for a purpose to be described below.

The fixed plate 46, somewhat larger than the clutch plate 50, is secured to the turbine element 18 at its periphery by means of a plurality of circumferentially spaced, radially extending lugs 62 which are fastened to the turbine shell 19 by a plurality of bolts or equivalent means. Fixed plate 46, which may be regarded as the driving clutch element, is provided with a centrally located boss 64 which is piloted into bearing 66 mounted in the dished, central portion 68 of casing 13. One end of the output shaft, designated 60a, is, in turn, rotatably journalled in the boss 64.

Fixed plate 46 also includes, for a purpose to be described later, unidirectional valve means 70. As shown in detail in FIGURE 6, valve 70 comprises a small aperture 72 extending through fixed plate 46 and a resilient, flexible reed 74 attached to the inside of said plate, said reed having a portion 74a overlying the aperture. This arrangement, it will be seen, permits controlled flow of fluid in through the aperture to clutch chamber 130 but prevents fluid from flowing out of said clutch chamber through said aperture.

Clutch actuating means are provided in the form of an annular, axially movable pressure plate or piston 48 adapted to compress the facings 55 on the peripheral portion of the clutch plate 50 between said movable plate and the axially fixed plate 46. Piston 48 includes a peripheral portion having sealing means 76 received inside and in engagement with the peripheral flange 46a on the fixed plate, and a centrally located, axially extending flange 46b slidable on the axially extending portion 32a of the turbine hub 32. Sealing means 78 are also provided between flange 46b and axially extending portion 32a. Piston 48 is further provided with a plurality of radially extending lugs 73 extending from the peripheral portion into the spaces between adjacent connecting lugs 62. Piston 48 is thus arranged for conjoint rotation with fixed plate 46 and the turbine 18 but is permitted limited axial movement toward and away from the fixed plate 46.

The pump

A preferred pump for delivering transmission fluid to the torque converter fluid circuit and for providing the pressurized fluid for engaging and disengaging the clutch may be of the type commonly referred to as an internal-external gear pump. As best illustrated in FIGURES 2 and 3, the pump casing 9 is provided with a shallow cylindrical cavity 80 offset or eccentrically positioned with respect to the rotational axis of output shaft 60. The outer or ring gear 82, having internal gear teeth, is rotatably received within said cavity, and the internal gear 86, which is provided with external gear teeth meshing with the internal gear teeth of ring gear 82, is rotatably journalled on a shoulder 88 on stator support 40.

Since the pitch diameter of the internal gear 86 is less than that of the external gear 82, and the external gear is eccentrically mounted with respect to the internal gear, a small space between said gears is formed on the side opposite the meshing area. Accordingly, a crescent 84, integral with pump casing 9, projects axially rearwardly to close this space between the internal and external gears. Internal gear 86 is driven by means of a plurality of axially extending tangs 83 on the rear portion of impeller sleeve shaft 37 which are received within a plurality of complementary slots or keyways 85 in the forward portion of gear 86.

In a preferred form of the invention, the pump is further provided with an accumulator 90 and a relief valve 91 (shown schematically in FIGURES 4 and 5). The accumulator 90 communicates with the discharge conduit 89 leading from pump discharge chamber 92 through passage 93. Relief valve 91 similarly communicates with the discharge chamber and provides a bypass to inlet through line 97 when the pressure exceeds a predetermined value. The pump inlet chamber 94 is fluidly interconnected with a source of fluid, which in this case would be the sump 98, by way of conduit 99.

The valve

Referring back to FIGURE 2 and more particularly to FIGURE 3, a valve 100 is provided for controlling fluid flow to and from the clutch and torque converter. The pump casing 9 includes a cylindrical bore 101 extending chordwise and transversely through the lower portion of said casing, said bore having a plurality of chambers and ports 102, 103, 104, 106, and 108 spaced throughout its length and a spring seat 109 at one end thereof. A valve spool 110, having spaced lands 112, 114 corresponding to the diameter of the bore, is slidably received within said bore. In the example, ports 102 and 108 both are fluidly interconnected with the sump 98 by way of a fluid passage (not shown). Port 106 is fluidly interconnected with the torque converter by way of a passageway formed in the enlarged portion of the stator support, a groove encircling the inner portion of internal gear 86 and the clearance between stator support shaft 40 and impeller sleeve shaft 37. Port 104 communicates with the discharge chamber 92 of the pump by way of passage 89. Port 103 is fluidly interconnected with the clutch chamber by way of a clearance between the output shaft 60 and the stator support sleeve shaft 40 and a fluid passage formed in said stator support (not shown).

With the valve spool 110 in the position shown in FIGURE 3, the lands 112 and 114 are so positioned as to provide fluid communication between ports 102 and 103 and also between ports 104, 106. In this position, fluid from the discharge side of the pump, which is directed through port 104, passes out of port 106 where it is delivered under pressure through the annular space between the stator support shaft 40 and impeller sleeve shaft 37 to the torque converter fluid circuit. At the same time, fluid is drained from the clutch chamber into port 103 and out through port 102 to sump. When the valve spool is shifted to the left (as viewed in FIGURE 3) port 103 is fluidly interconnected with port 104 and port 106 is interconnected with port 108. Fluid from the pump under discharge pressure thus flows from port 104 out through port 103 to the clutch, and fluid is drained from the torque converter into port 106 and out through port 108 to the sump.

The hydraulic system and operation

Attention is directed to FIGURE 2 where it will be noted that a clearance is provided between the stator support sleeve 40 and the impeller sleeve shaft 37 to provide an annular fluid passage 120. A plurality of radially extending apertures or slots 122 are located between one-way engaging device 38 and the adjacent locating element to provide a fluid passage interconnecting annular passage 120 and the torque converter fluid circuit. Fluid passages are also formed between adjacent connecting lugs 62 to provide passages between the shell of the turbine 19 and the annular, axially movable pressure plate or piston 48 associated with the clutch. It will be noted, too, that clearance is provided between fixed plate 46 and the forward portion of casing 13. The unidirectional valve 70 in the fixed plate 46 of the clutch permits controlled one-way fluid flow from the space between casing 13 and fixed clutch plate 46 into the clutch chamber 130. A series of apertures 131 extend through the hub 51 of clutch plate 50 to equalize pressure in the clutch chamber 130 on both sides of said clutch plate. An annular passage 136 is also provided between the output shaft 60 and the stator support sleeve 40, said passage being fluidly interconnected by means of an additional passage (not shown) in the stator support to port 102 in the control valve 100.

In FIGURE 4, a schematic illustration of the hydraulic circuit with the clutch in the engaged position, the valve spool 110 is shown as being positioned within the valve bore to permit fluid at discharge pressure from the pump to flow by way of line 89, port 104, port 106, and conduit 124 to the outer annular fluid passage 120. From passgae 120, the transmission fluid flows in through slots 122 into the torque converter fluid circuit.

Fluid within the converter circuit is discharged past the outer edge of the turbine and down through passages formed between adjacent connecting lugs 62 into the space between the piston 48 and the turbine shell 19 to urge said piston into engagement with the clutch plate 50. At the same time, fluid is discharged into the clearance between the fixed plate 46 and the forward wall of casing 13 and is permitted to flow into clutch chamber 130 through one-way valve means 70. The one-way valve means maintains a pressure differential between the space surrounding the clutch chamber 130 and the interior thereof so that the movable pressure plate 48 is firmly engaged with the clutch plate 50. Fluid inside the clutch chamber 130 passes through apertures 58 in bearing 57 and through the annular passage 136 between the output shaft 60 and the stator support sleeve 40 to be returned to the valve 100 by way of line 128. Since the spool in the position shown in FIGURE 4 interconnects ports 102 with 103, fluid from the clutch chamber is discharged to the sump.

When it is desired to disengage the clutch, the valve spool is shifted to the position shown schematically in FIGURE 5 so that flow from lines 124 and 128 are reversed in which case fluid under pump discharge pressure passes through line 128 directly to the clutch chamber 130 to shift the axially movable pressure plate 48 away from the axially shifted plate 46 to disengage the clutch. One-way valve member 70 does not permit fluid to flow out from the clutch chamber so that the pressure builds up sufficiently to positively disengage the clutch and disconnect the turbine from the output shaft. Fluid from the converter passes out through annular passage 120, through line 124, port 106, and port 108 to the sump. When the shift has been completed, the spool is again moved to the position shown in FIGURE 4 to permit normal operation with the torque converter operative and the clutch engaged.

The countershaft transmission

As illustrated schematically in FIGURE 1, the output shaft 60 from the torque converter is connected to the driving wheels (not shown) through a manually-operated countershaft transmission E. The transmission E is of a conventional design and differs from a standard three-speed forward one-speed reverse transmission only in the omission of low gear and the full synchronization of all the other gears. First gear may be conveniently removed without adverse effects on the drive characteristics because of the torque multiplication that takes place in the torque converter.

The output shaft 60 of the torque converter which, for convenience, may be considered as the driving shaft of the transmission, has a terminal portion into which is piloted one end of the driven shaft 150. Drive shaft 60 carries a spur gear 154, and this gear is in constant mesh with a gear 156 of a gear cluster 151. Gear cluster 151 is rotatably disposed on a countershaft 152 extending generally parallel to the driven shaft 150.

Clutch 168, commonly known as a synchronizing clutch, includes a hub portion 169 directly connected to the output shaft or driven shaft 150. This clutch further includes a clutching collar 168 adapted to positively couple either gear 154 or gear 160, which is similarly journalled on the driven shaft 150, to the hub portion of said clutch and therefore to the driven shaft 150. Another positive acting synchronizing clutch 170 is associated with gear 164, also journalled on the driven shaft 150, and is adapted to couple the hub portion of the clutch 170 to gear 164.

Low speed drive is obtained by coupling the gear 160 to the driven shaft 150 by moving clutching collar 168 to the right as viewed in FIGURE 1. Drive is transmitted through spur gear 154 and gear 156 to the gear cluster 151 and from gear 158 on the gear cluster to low gear 160 and then through the clutch to the output or driven shaft 150. High speed drive is obtained by coupling the driven shaft 150 to the spur gear 154 by moving clutch collar 168 to the left as viewed in FIGURE 1 directly coupling said spur gear to the hub portion 169 of the synchronizing clutch. This is, of course, direct or 1:1 drive so that the speed of the output shaft or driven shaft 150 is the same as the drive shaft 60. Reverse drive is obtained by clutching gear 164 to the hub portion of clutch 170 by neutralizing collar 168 and moving the clutch collar 170 to the right as viewed in FIGURE 1. Drive is thus transmitted from spur gear 154 and gear 156 to the gear cluster 151, and from gear 162 on the gear cluster, through the reverse idler gear 163, to gear 164. Gear 164 transmits the drive through the clutching device to hub 171 connected to driven shaft 150. It should be understood that the description of the particular transmission is merely representative of various types of gear boxes which may be employed in combination with the torque converter and clutch of the present invention.

The control mechanism

In a preferred form of the invention, the control for operating the valve 100 in the hydraulic circuit is associated with the shifting mechanism for operating the countershaft transmission. The shift lever for moving the synchronizer elements into their various positions, whether it be mounted on the steering column or on the floor, has associated therewith a microswitch operative to selectively energize and deenergize solenoid 140 which controls the position of valve 100. The actual switching mechanism per se forms no part of the present invention and an acceptable unit for use with the present invention is more fully described in copending U.S. patent application Serial No. 128,916, filed in the name of R. L. Smirl et al. on August 2, 1961. The operation of the mechanism may be briefly described, however, so that an understanding of the invention may be facilitated without referring more particularly to the above-identified application.

Accordingly, when the driver wishes to change gears, for example, from low speed range to high speed range, he moves the shift lever 141 which actuates the solenoid moving the operating rod to the right as shown in FIGURE 5. The valve then assumes the position shown in FIGURE 5 permitting pressure fluid from the pump to be discharged into the clutch chamber disengaging the clutch and cutting off the drive from the turbine element of the torque converter to the output shaft 60. This permits the synchronized clutching of the countershaft transmission to the high range drive which is accomplished by shifting the collar 168 to the left as shown in FIGURE 1. When the shift has been completed, the gear shift lever is in the position shown in FIGURE 4 and the solenoid is deenergized permitting the spring associated valve spool to urge the same to the left to assume the position illustrated in FIGURE 4. Thus, when any shift is made, the valve spool is immediately moved to permit the clutch to be disengaged to facilitate the shift and automatically returned to the clutch engaging position when the shift is completed.

Summary

Having thus particularly described the invention, it should be apparent that there has been provided an improved transmission embodying a practical compromise of a smooth-performing but costly fully automatic transmission and the relatively less expensive manual transmission. Moreover, the simplicity of the transmission herein described renders it less costly to maintain and operate under all conditions. The other features of the fully automatic transmission such as brake bands, servos, complicated hydraulic systems, plural pump arrangements, and a multiplicity of solenoids and actuating devices are eliminated by the simple construction of the present transmission.

While the invention has been described in connection with a certain specific embodiment, it should be understood that the description is set forth merely as an example, and that various modifications will be obvious to those skilled in the art. Therefore the scope of the invention is defined solely by the appended claims which should be construed as broadly as the prior art will permit.

What is claimed is:
1. Transmission apparatus comprising:
   rotatably mounted impeller and turbine elements forming a hydraulic circuit, said impeller element being adapted to circulate fluid under pressure around said hydraulic circuit;
   a rotatably mounted driven member adapted to be driven by said turbine element;
   clutch means including driving and driven clutch elements operatively associated with said turbine and driven member respectively, said clutch being adapted to releasably clutch said turbine element to said driven member;
   clutch actuating means operatively associated with said clutch means;
   first fluid passage means for supplying fluid under pressure from said hydraulic circuit to said clutch actuating means to engage said clutch means;
   second fluid passage means for supplying fluid under pressure to said clutch actuating means to disengage said clutch means; and
   means for providing limited flow from said first fluid passage means to second fluid passage means and for preventing flow from said second fluid passage means to said first fluid passage means.

2. Transmission apparatus as defined in claim 1 including
   valve means for selectively supplying fluid to said first fluid passage means to charge the hydraulic circuit and engage said clutch means or supplying fluid to said second fluid passage means to disengage said clutch means.

3. Transmission apparatus as defined in claim 2 including
   a speed change gear box driven by said rotatably mounted driven member;
   shift means for selectively shifting said gear box to obtain different drive ratios; and
   control means responsive to movement of said shift means for actuating said valve means.

4. Transmission apparatus comprising:
   rotatably mounted impeller and turbine elements forming a hydraulic circuit, said impeller element being adapted to circulate fluid under pressure around said hydraulic circuit;
   a rotatably mounted driven member adapted to be driven by said turbine element;
   clutch means including driving and driven clutch elements operatively associated with said turbine and driven member respectively, said clutch being adapted to releasably clutch said turbine element to said driven member;
   clutch actuating means comprising a displaceable piston adapted to frictionally couple said driving and driven clutch elements;
   first fluid passage means for supplying fluid under pressure from said hydraulic circuit to one side of said piston to engage said clutch means;
   second fluid passage means for supplying fluid under pressure to the opposite side of said piston to disengage said clutch means; and
   means for providing limited flow from said first fluid passage means to said second fluid passage means and for preventing flow from said second fluid passage means to said first fluid passage means.

5. Transmission apparatus as defined in claim 4 including
   valve means for selectively supplying fluid to said first fluid passage means to charge the hydraulic circuit and engage said clutch means or supplying fluid to said second fluid passage means to disengage said clutch means.

6. Transmission apparatus as defined in claim 5 including
   a speed change gear box driven by said rotatably mounted driven member;
   shift means for selectively shifting said gear box to obtain different drive ratios; and
   control means responsive to movement of said shift means for actuating said valve means.

7. Transmission apparatus comprising:
   rotatably mounted impeller and turbine elements forming a hydraulic circuit, said impeller element being adapted to circulate fluid under pressure around said hydraulic circuit;
   a rotatably mounted driven member adapted to be driven by said turbine element;

clutch means including driving and driven clutch elements operatively associated with said turbine and driven member respectively, said driven clutch element including an annular member carried by said driven member, said driving clutch element comprising an annular element carried by said turbine element;

clutch actuating means comprising an annular piston carried by said driving clutch element and forming a clutch chamber with said driving clutch element, said clutch chamber enclosing said clutch driven member;

first fluid passage means for supplying fluid under pressure from said hydraulic circuit to one side of said piston to displace said piston into engagement with said clutch elements and thereby frictionally couple said turbine element to said driven member;

second fluid passage means for supplying fluid under pressure into said clutch chamber; and unidirectional valve means for permitting controlled flow of fluid into said clutch chamber from said first fluid passage means and for preventing fluid flow out of said clutch chamber into said first fluid passage means when fluid is supplied to said clutch chamber by said second fluid passage means.

8. Transmission apparatus as defined in claim 7 wherein said unidirectional valve means comprises means defining an aperture in said driving clutch element; and a flexible member on the inside of said clutch chamber having a portion overlying said aperture.

9. Transmission apparatus as defined in claim 7 including valve means for selectively supplying fluid to said first fluid passage means to charge the hydraulic circuit and engage said clutch means or supplying fluid to said second fluid passage means to disengage said clutch means.

10. Transmission apparatus as defined in claim 9 including a speed change gear box driven by said rotatably mounted driven member;

shift means for selectively shifting said gear box to obtain different drive ratios; and control means responsive to movement of said shift means for actuating said valve means.

11. Transmission apparatus comprising:

a rotatably mounted driving member;

a fluid coupling including a housing; a rotatable impeller element driven by said driving member through said housing and a rotatable turbine element, said impeller and turbine elements forming a hydraulic circuit;

means defining a clutch chamber enclosed by said housing, said means including a driving clutch element and a piston;

unidirectional valve means in one of said clutch chamber defining means operative to permit controlled flow of fluid from said hydraulic circuit into said clutch chamber and to prevent fluid from flowing from said clutch chamber to said hydraulic circuit;

a pump having an inlet and an outlet;

a hydraulic system including first fluid passage means between said pump outlet and said housing to charge said hydraulic circuit and second fluid passage means interconnecting said pump outlet to the interior of said clutch chamber; and valve means adapted to supply fluid under pressure from said pump outlet to either said first fluid passage means or said second fluid passage means.

12. Transmission apparatus as defined in claim 11 including a speed change gear box driven by said rotatably mounted driven member;

shift means for selectively shifting said gear box to obtain different drive ratios; and control means responsive to movement of said shift means for actuating said valve means.

13. Transmission apparatus comprising:

rotatably mounted impeller and turbine elements forming a hydraulic circuit, said impeller element being adapted to circulate fluid under pressure around said hydraulic circuit;

a rotatably mounted driven member adapted to be driven by said turbine element;

means defining a clutch chamber, said means including a driving clutch element carried by said turbine element and a pressure actuated piston adapted to be shifted toward and away from said driving clutch element;

a driven clutch element connected to said driven member and disposed within said clutch chamber;

first fluid passage means for supplying fluid under pressure from said hydraulic circuit to one side of said piston to urge said piston so as to engage said clutch driving and driven elements;

second fluid passage means for supplying fluid under pressure to the interior of said clutch chamber to apply fluid to the opposite side of said piston to disengage said clutch driving and driven members;

unidirectional valve means permitting limited flow from said first fluid passage means into said clutch chamber and through said second fluid passage means, and for preventing flow from the interior of said clutch chamber to said first fluid passage means when fluid is supplied to disengage said clutch means.

14. Transmission appaartus as defined in claim 13 including valve means for selectively supplying fluid to said first fluid passage means to charge the hydraulic circuit and engage said clutch means or supplying fluid to said second fluid passage means to disengage said clutch means.

15. Transmission apparatus as defined in claim 14 including a speed change gear box driven by said rotatably mounted driven member;

shift means for selectively shifting said gear box to obtain different drive ratios; and control means responsive to movement of said shift means for actuating said valve means.

16. Transmission apparatus comprising:

a hydrokinetic torque converter, said torque converter embodying annular, vaned impeller, turbine and reaction elements, which three elements together form a hydraulic circuit;

means mounting said impeller and turbine elements for rotational movement, said impeller element being adapted to circulate fluid under pressure around said hydraulic circuit;

a rotatably mounted driving member;

a driving shell providing a rigid rotatable driving connection between said driving member and the impeller element, said turbine element being disposed within said shell between the impeller element and the driving member;

a driven shaft extending through said annular impeller and turbine element;

a driven clutch element on said driven shaft to rotate therewith;

an annular driving clutch element carried by said turbine element;

an annular clutch engaging piston forming together with said driving clutch element a clutch chamber substantially enclosing said clutch driven element, said piston being axially displaceable to engage said clutch driving and driven elements to frictionally couple said turbine element to said driven shaft;

means providing a fluid passage interconnecting said torque converter hydraulic circuit to supply hydraulic fluid under pressure to one side of said piston;

a pump having a discharge port and an inlet port, said inlet port being connected to a fluid reservoir; and valve means receiving fluid from said pump discharge port for selectively supplying fluid pressure to either said torque converter fluid circuit or said clutch chamber to selectively move said piston into and out of engagement with said driving or driven clutch elements.

17. Transmission apparatus as defined in claim 16 including a speed change gear box driven by said rotatably mounted driven member;

shift means for selectively shifting said gear box to obtain different drive ratios; and control means responsive to movement of said shift means for actuating said valve means.

References Cited by the Examiner

UNITED STATES PATENTS 3,213,988  10/1965  Maurice et al. _____ 192—86

FOREIGN PATENTS 1,327,921  4/1963  France.
950,049  2/1964  Great Britain.

DAVID J. WILLIAMOWSKY, *Primary Examiner.*

DON A. WAITE, *Examiner.*

H. S. LAYTON, *Assistant Examiner.*